US011010729B2

(12) United States Patent
Musiala, Jr. et al.

(10) Patent No.: US 11,010,729 B2
(45) Date of Patent: May 18, 2021

(54) CRYPTOCONOMY SOLUTION FOR ADMINISTRATION AND GOVERNANCE IN A DISTRIBUTED SYSTEM

(71) Applicant: PricewaterhouseCoopers LLP, NY, NY (US)

(72) Inventors: Robert A. Musiala, Jr., Chicago, IL (US); George Prokop, New York, NY (US)

(73) Assignee: PricewaterhouseCoopers LLP, New York, NY (US)

( * ) Notice: Subject to any disclaimer, the term of this patent is extended or adjusted under 35 U.S.C. 154(b) by 652 days.

(21) Appl. No.: 15/486,170

(22) Filed: Apr. 12, 2017

(65) Prior Publication Data

US 2017/0300876 A1 Oct. 19, 2017

Related U.S. Application Data

(60) Provisional application No. 62/322,710, filed on Apr. 14, 2016.

(51) Int. Cl.
| | |
|---|---|
| *G06Q 20/06* | (2012.01) |
| *G06Q 20/38* | (2012.01) |
| *G06Q 20/36* | (2012.01) |
| *G06Q 40/02* | (2012.01) |

(52) U.S. Cl.
CPC ......... *G06Q 20/0655* (2013.01); *G06Q 20/36* (2013.01); *G06Q 20/381* (2013.01); *G06Q 40/02* (2013.01); *G06Q 2220/00* (2013.01)

(58) Field of Classification Search
None
See application file for complete search history.

(56) References Cited

U.S. PATENT DOCUMENTS

| 2015/0269541 A1* | 9/2015 | MacGregor | G06Q 20/10 |
| | | | 705/39 |
| 2015/0324768 A1 | 11/2015 | Filter et al. | |
| 2015/0324789 A1 | 11/2015 | Dvorak et al. | |
| 2015/0332256 A1† | 11/2015 | Minor | |

(Continued)

OTHER PUBLICATIONS

International Search Report and Written Opinion for PCT Application No. PCT/US2017/027378, dated Jul. 3, 2017, filed Apr. 13, 2017, 12 pages.

*Primary Examiner* — Jamie R Kucab
(74) *Attorney, Agent, or Firm* — Morrison & Foerster LLP

(57) ABSTRACT

A computer-implemented process, system, and computer readable medium are provided for administration and governance of fiat and cryptocurrency funds in a distributed computer system. In one example, a process includes, at an electronic device with one or more processors and memory, accessing a list of a plurality of participant nodes, which may include a fund administrator receiving a list of participants or nodes. The method further includes transferring crypto-currency (e.g., that is pegged to U.S. dollars, local currency, or the like) to one or more of the participant nodes. Each of the participant nodes may include an interface portal (e.g., a web-portal) for viewing transferred crypto-currency and for transacting (e.g., bidding, soliciting, etc.) with other participant nodes of the list of participant nodes with the crypto-currency.

26 Claims, 13 Drawing Sheets

(56) References Cited

U.S. PATENT DOCUMENTS

2015/0356555 A1* 12/2015 Pennanen .............. G06Q 20/06
                                                              705/71
2016/0071108 A1   3/2016  Caldera et al.
2016/0342976 A1* 11/2016  Davis ................. G06Q 20/3829
2017/0357966 A1* 12/2017  Chandrasekhar .. G06Q 20/3829

* cited by examiner
† cited by third party

CRYPTOCONOMY SOLUTION FOR ADMINISTRATION AND GOVERNANCE IN A DISTRIBUTED SYSTEM

RELATED APPLICATIONS

The present invention claims benefit to U.S. provisional patent application No. 62/322,710, entitled, "ADMINISTRATION AND GOVERNANCE IN A DISTRIBUTED SYSTEM," filed on Apr. 14, 2016, and which is incorporated herein by reference for all purposes.

FIELD OF THE INVENTION

The present disclosure relates generally to systems and methods relying on cryptocurrency and blockchain technology for funds governance and distribution, and in one particular example, using a permissioned, "closed economy" Blockchain Smart Contracts Platform and related cryptocurrency wallet system.

BACKGROUND OF THE INVENTION

Global demand for international development and humanitarian assistance funds continues to rise. According to the Organization for Economic Cooperation and Development (OECD), the market for humanitarian aid and international development is approximately $200 billion per year. However, difficulties governing and administering the flow of funds pose serious obstacles to aid missions. According to World Bank estimates, up to 30% of funds allocated for international development and humanitarian missions are lost to fraud, waste, abuse, and other forms of economic crime and ineffective governance. Further inefficiencies result from the cost and time required to move money through traditional banking systems. The cumulative effect of these difficulties has caused an erosion of trust and confidence that adversely affects the donor base and the citizen-state relations of countries that receive the funds.

As is appreciated by those of ordinary skill in the art, cryptocurrency and blockchain technologies offer a new disintermediated method of remittance that allows value to be transferred over the internet, with little or no reliance on the payment systems used by the traditional banking sector. At the same time, access to the internet and to mobile devices has been expanding rapidly to underbanked and unbanked populations around the globe, including the citizenry of countries that receive development and aid mission funds. These developments in technology present a unique opportunity to harness the collective properties of cryptocurrency, blockchain technology, smart contracts, data analytics systems, and internet based application interface software to provide an unprecedented level of speed, security, and transparency to the systems that oversee, administer, and govern funds allocated for international development and humanitarian aid missions.

The present invention provides a system that enables these benefits of speed, transparency, and security to materialize in the context of development and aid projects, as will be apparent from the following detailed description and accompanying figures. While the present invention is described in the context of international development and humanitarian aid, iterations of the present invention may be used in the context of various other types of public and private procurement projects.

SUMMARY OF THE INVENTION

According to one aspect of the invention, a computer-implemented process for administration and governance of fiat and cryptocurrency funds in a distributed computer system is provided. In one example, a process includes, at an electronic device with one or more processors and memory, accessing a list of a plurality of participant nodes, which may include a fund administrator receiving a list of participants or nodes. The process further includes transferring crypto-currency (e.g., that can be pegged to U.S. dollars, local currency, or the like) to one or more of the participant nodes. Each of the participant nodes may include an interface portal (e.g., a web-portal) for viewing transferred crypto-currency and for transacting (e.g., bidding, soliciting, etc.) with other participant nodes of the list of participant nodes with the crypto-currency.

The process may further facilitate monitoring transactions of crypto-currency amongst the list of participant nodes, maintaining a blockchain ledger of the transactions of crypto-currency, and approving fiat fund conversion requests from the plurality of participant nodes based at least on the maintained blockchain ledger. In some examples, a blockchain smart contracts platform may be implemented that is programmed with a specific set of rules designed to restrict, facilitate, and automate the transfer of cryptocurrency and trigger notices to various parties in a manner that streamlines funds governance, promotes transparency, and limits fraud, waste, and abuse.

Additionally, the exemplary processes may pull or receive data from the blockchain, smart contracts platform, data analytics platform, and report generation tools, and displays the data to users to streamline funds governance, promote transparency, and limit fraud, waste, and abuse.

In some examples, exemplary processes may further include or interoperate with a cryptocurrency wallet system and a smart contracts platform, to enable a technical administrator to set permissions over and exercise "real time" control over cryptocurrency transactions and contracts "rules." In some examples, the blockchain and cryptocurrency wallet system can be specifically designed to support a "closed economy" restricted to participants in a specific international development or humanitarian aid mission.

Further, in some examples, the exemplary process can connect traditional banking systems with the blockchain and contracts platform to automate and facilitate communication between such systems to streamline funds governance, promote transparency, and limit fraud, waste, and abuse. Such processes may include "minting" new units of cryptocurrency in a one-to-one ratio with donations of U.S. dollars, for example.

Further, in some examples, a data analytics platform is provided that pulls/receives data from the blockchain and smart contracts platform and aggregates, sorts, and displays the data to specific parties. A report generation tool can further be included to generate reports from data generated by the data analytics platform and display the reports to various parties.

Additionally, systems, electronic devices, graphical user interfaces, and non-transitory computer readable storage medium (the storage medium including programs and instructions for carrying out one or more processes described) for administration and governance of fiat and cryptocurrency funds in a distributed computer system are described.

BRIEF DESCRIPTION OF THE DRAWINGS

The present application can be best understood by reference to the following description taken in conjunction with the accompanying drawing figures, in which like parts may be referred to by like numerals.

FIG. 2 also shows one example of the basic design and interoperability between and among system components, and the flow of data between and among system components and system participants.

FIG. 3 also shows one example of the flow of data and authority permissions between and among the Donor portal and other portals of the Web Based Application and components of the system.

FIG. 4 also shows one example of the flow of data and authority permissions between and among the Technical Administrator portal and other portals of the Web Based Application and components of the system.

FIG. 5 also shows one example of the flow of data and authority permissions between and among the Trustee Bank portal and other portals of the Web Based Application and components of the system.

FIG. 6 also shows one example of the flow of data and authority permissions between and among the Project Administrator portal and other portals of the Web Based Application and components of the system.

FIG. 7 also shows one example of the flow of data and authority permissions between and among the Participant portal and other portals of the Web Based Application and components of the system.

FIG. 8 also shows one example of the flow of data and authority permissions between and among the First-Tier Node portal and other portals of the Web Based Application and components of the system.

FIG. 9 also shows one example of the flow of data and authority permissions between and among the Second- and Third-Tier Node portals and other portals of the Web Based Application and components of the system.

FIG. 13 also shows one example of how project reports may be generated through the interoperation between and among the Data Analytics Platform, Report Generation Tool, and Web Based Application.

DETAILED DESCRIPTION OF THE INVENTION

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the present technology. Thus, the disclosed technology is not intended to be limited to the examples described herein and shown, but is to be accorded the scope consistent with the claims.

Figure 3:
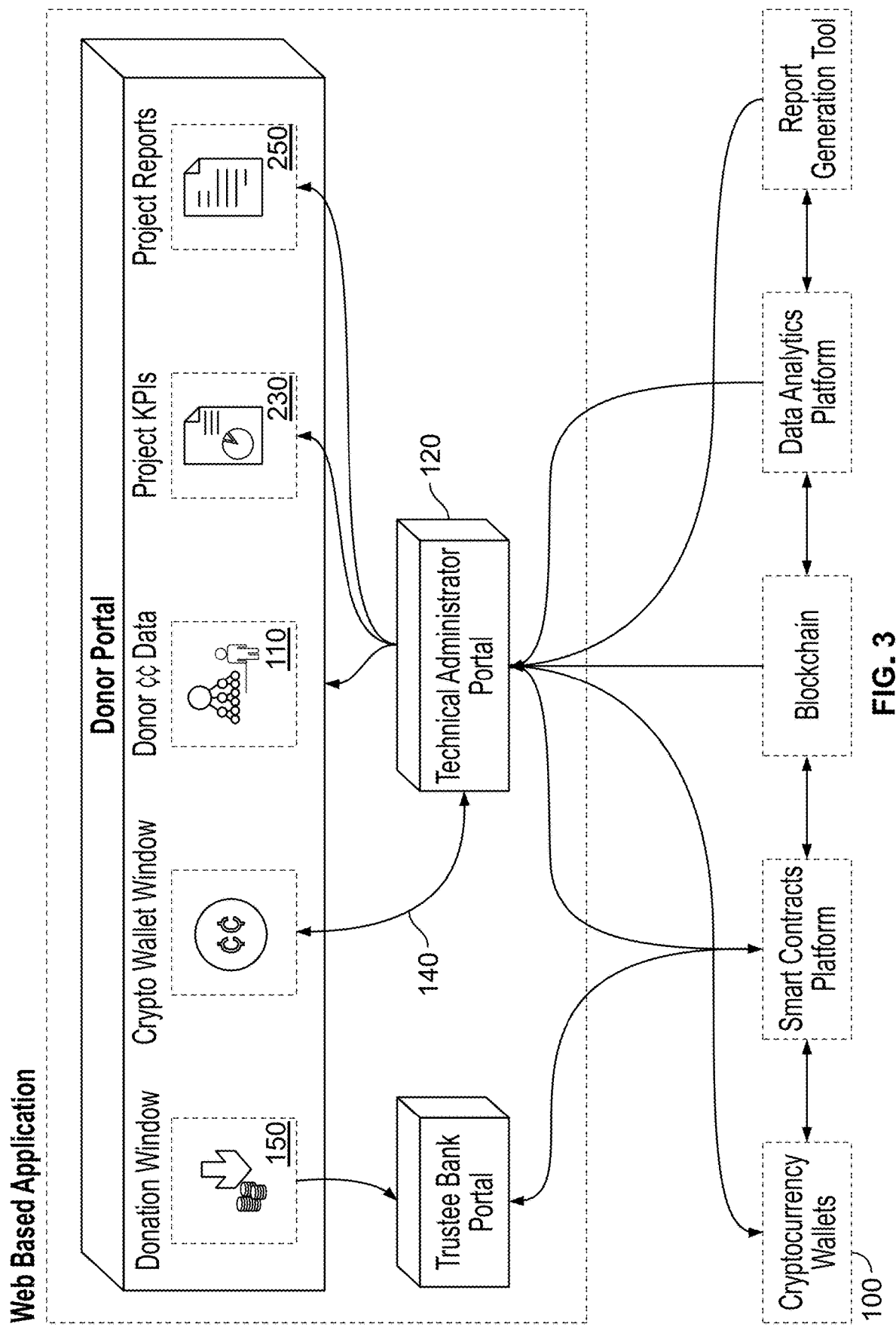
FIG. 3 is a diagram showing one example of certain functions of the Donor portal that can be accessed through the Web Based Application.
Figure 4:
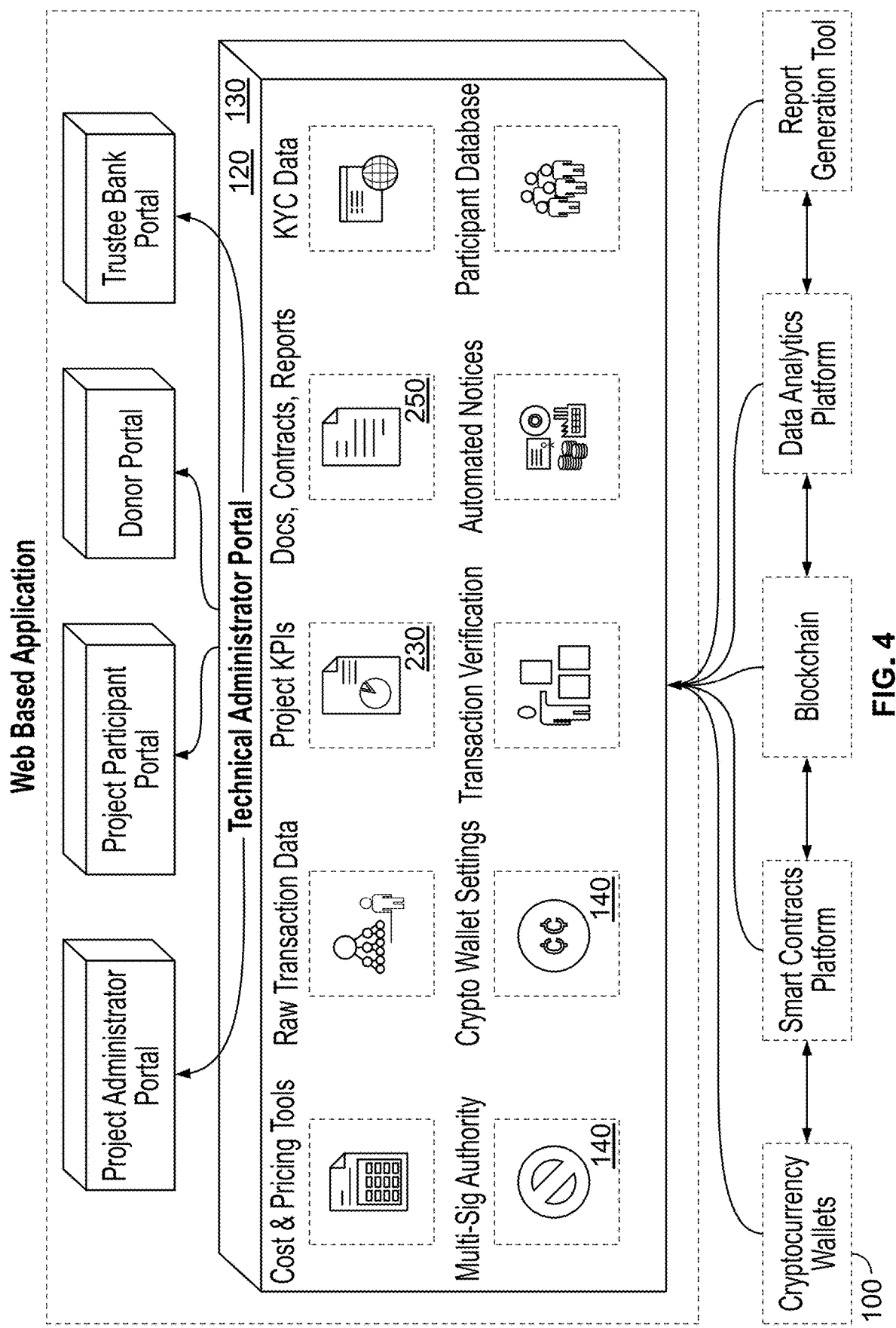
FIG. 4 is a diagram showing one example of functions of the Technical Administrator portal that can be accessed through the Web Based Application.
Figure 5:
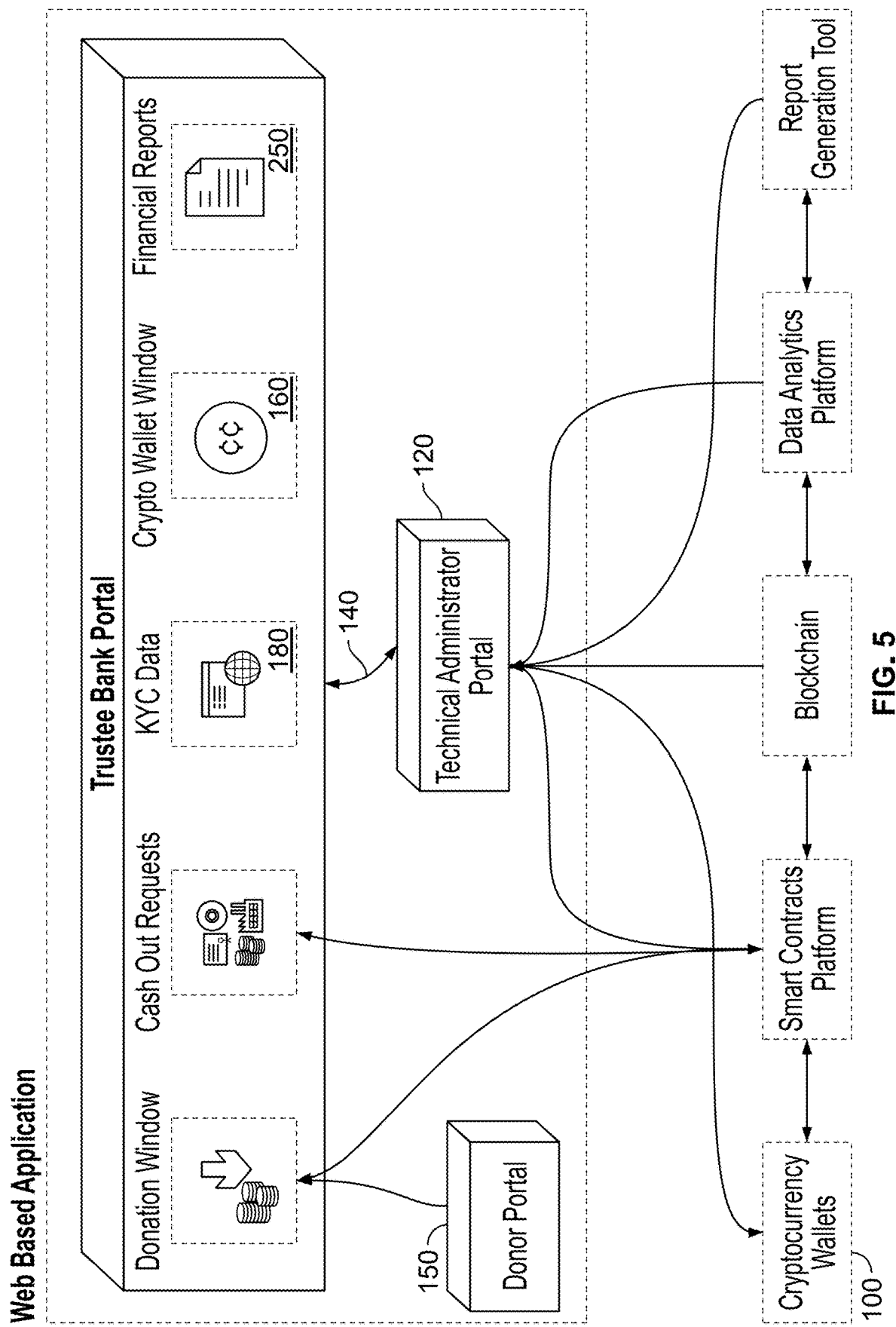
FIG. 5 is a diagram showing one example of functions of the Trustee Bank portal that are accessed through the Web Based Application.
Figure 6:
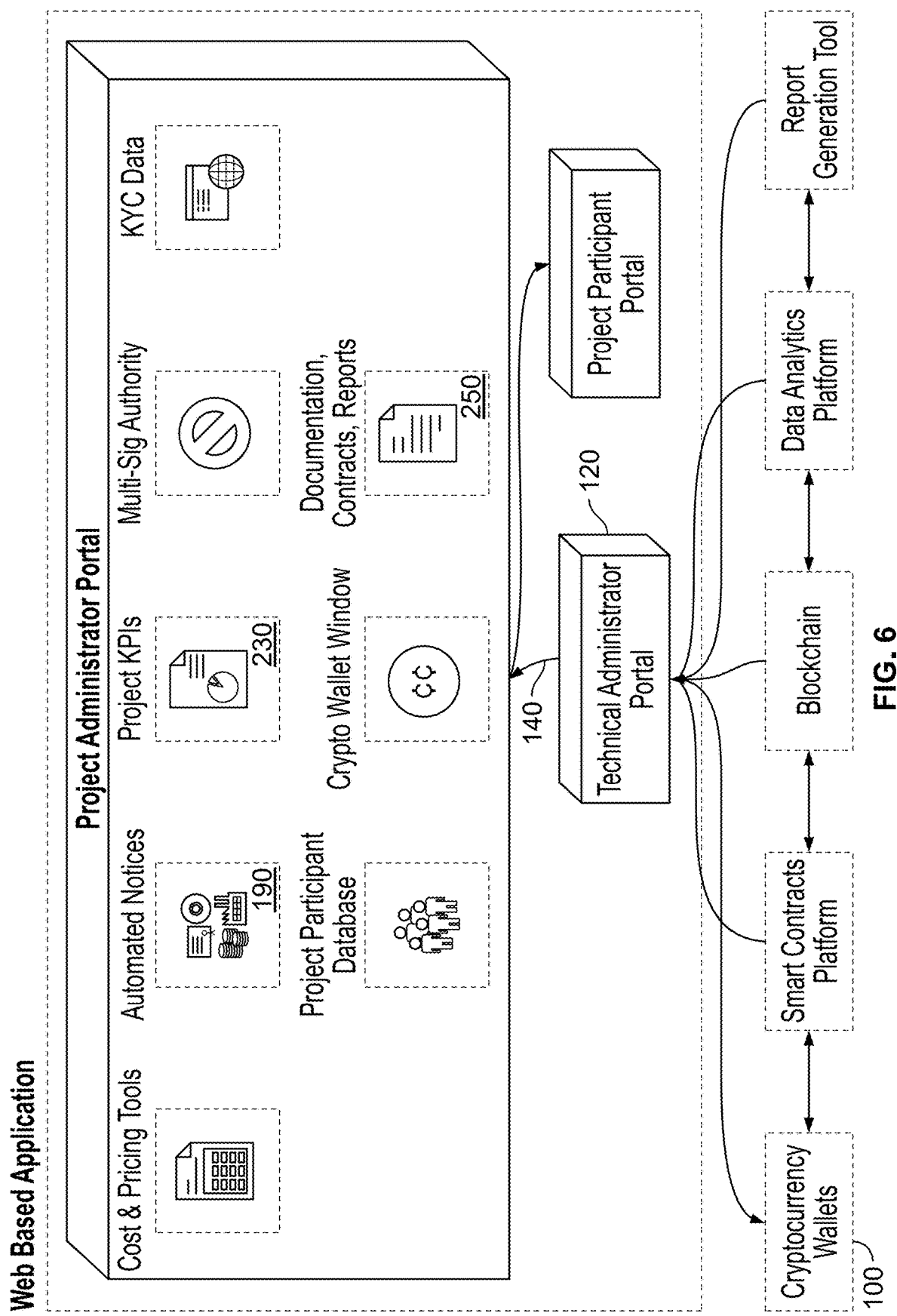
FIG. 6 is a diagram showing one example of functions of the Project Administrator portal that are accessed through the Web Based Application.
Figure 7:
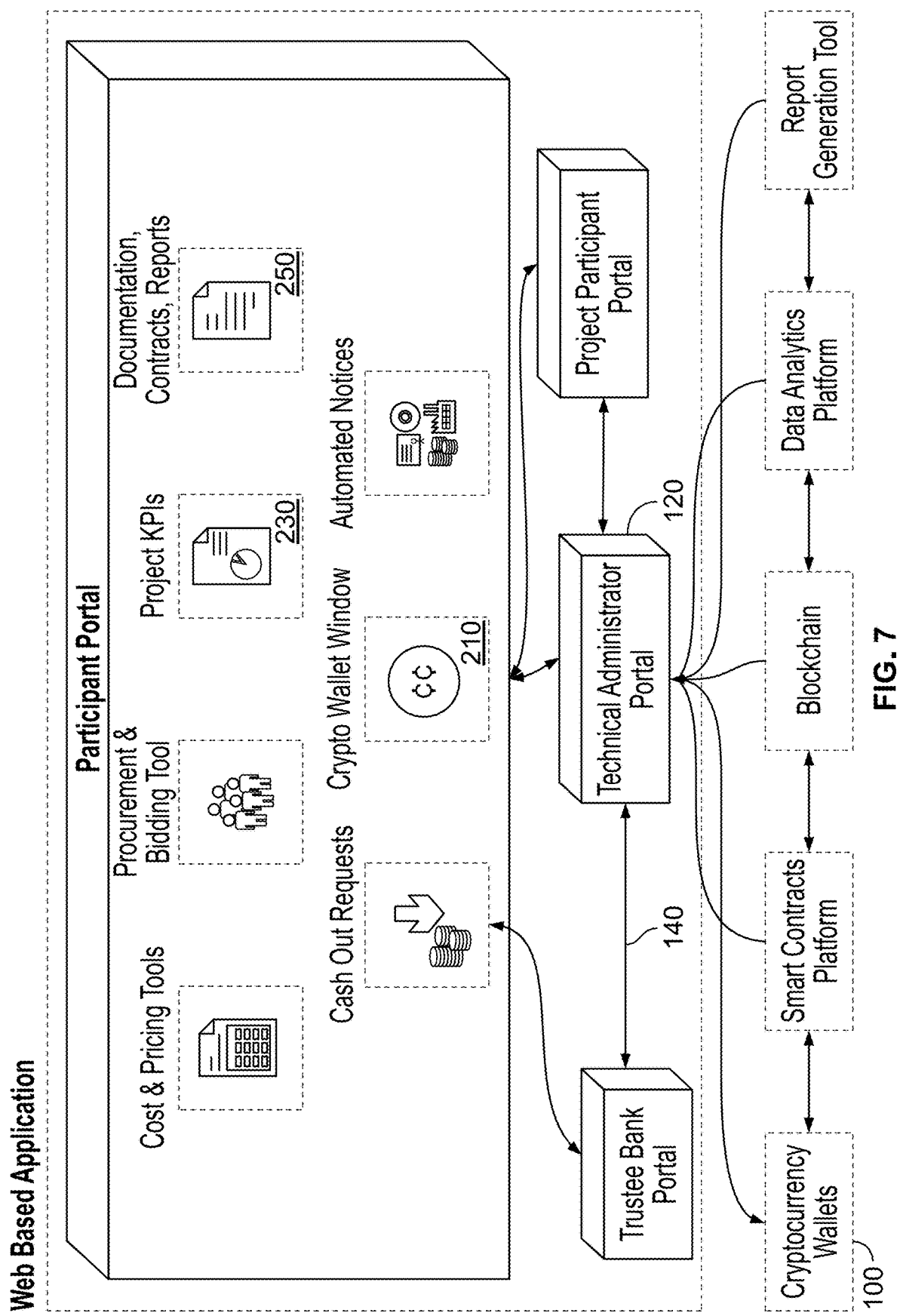
FIG. 7 is a diagram showing one example of functions of the Participant portal that are accessed through the Web Based Application.
Figure 12:
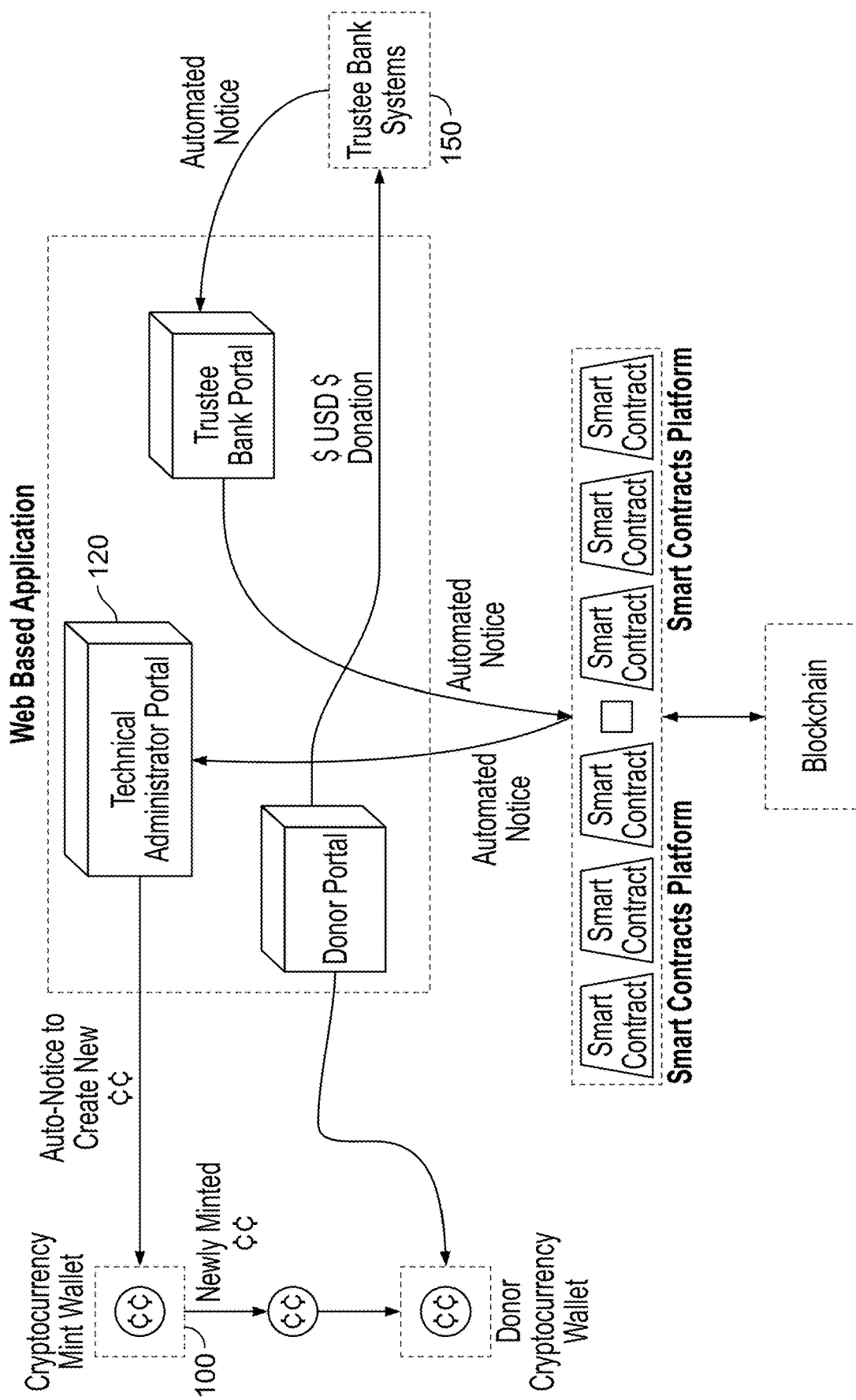
FIG. 12 is a diagram showing one example of the process by which new units of cryptocurrency are "minted" through interoperation between and among the Donor portal, Trustee Bank systems, Trustee Bank portal, Blockchain Smart Contracts Platform, Technical Administrator portal, and cryptocurrency wallets.

One embodiment of the invention includes a web-based application available for download in a public, permissionless version and/or various private, permissioned versions. (Various embodiments of the Web Based Application are depicted in FIGS. 2-7.) For instance, continuing with an example of an international development and humanitarian aid mission, donors may remit donation funds through the application using established electronic payment methods. Donated funds can be remitted to an escrow account at a trustee bank. (Examples of the process by which funds are donated through a Donor portal to the Trustee Bank are depicted in FIGS. 3 and 5.) A proprietary, private/Permissioned Blockchain Smart Contracts Platform can be implemented to create a unique unit of cryptocurrency for each dollar donated. Each cryptocurrency unit can be earmarked to a specific dollar residing in the trust account, tracked using the Blockchain Smart Contracts Platform, and displayed via the web-based application. (An example of the process by which new cryptocurrency is minted as funds are received by the Trustee Bank is depicted in FIG. 12.)

The cryptocurrency can be distributed to participants in international development and humanitarian aid missions via cryptocurrency wallets residing on the Blockchain Smart Contracts Platform. The cryptocurrency wallets are accessible through the web based application and have the look and feel of an online bank account. Participants in the development/relief effort (e.g., non-profit organizations, contractors, subcontractors, suppliers, laborers) transact using the cryptocurrency in lieu of fiat currency. (Examples of cryptocurrency wallets are depicted at 100 in FIGS. 1-12.) The smart contracts platform restricts transfer of the cryptocurrency to specific, approved transaction typologies between approved parties. (See FIG. 11.)

A data analysis tool can interoperate with the Blockchain Smart Contracts Platform to pull, organize, and display data in real-time from the cryptocurrency transaction graph. The data can be made available to the various project participants (including the donors of the funds) through the web based application, in varying levels of scope/detail, based on pre-approved access rights. The data analysis tool can further automatically generate real-time, key performance indicators that can be used by project participants to inform decision making. (See FIG. 13.)

While project participants transact in cryptocurrency, the fiat funds earmarked to the cryptocurrency remain in the escrow account held by the bank trustee. As participants receive payments in cryptocurrency for work completed, the portion of each cryptocurrency payment representing the participant's contractual profit amount may be redeemed for fiat funds distributed from the escrow account. When a participant completes their involvement in the project, any cryptocurrency remaining in their blockchain-based wallets that represents commercial profit may similarly be redeemed for fiat funds.

Replacing cash and bank accounts with a proprietary cryptocurrency that resides on a private, permissioned blockchain provides several advantages that may solve many longstanding problems that plague international development and humanitarian aid missions. The key advantages relate to transparency, speed, and security over donated funds. As is appreciated by those of ordinary skill in the art, cryptocurrency and blockchain technology generate real-time data on transactions that is visible through a shared, immutable ledger. This data may be used by participants in development and relief projects to better analyze the ecosystem and inform their decision-making. Cryptocurrency and blockchain also enable funds to be transferred faster, and at less cost, than other traditional payment methods, providing speed and efficiency to meet the needs of circumstances where time is of the essence. A third advantage is that cryptocurrency and blockchain technology can be programmed with smart contracts that enhance security over funds by creating "rules" that govern the transfer of cryptocurrency funds. By restricting funds transfers to specific categories of approved transactions, smart contracts may prevent funds from being lost to fraud, waste, and abuse.

Interoperability Among System Components

One aspect of the invention includes multiple system components that perform various independent functions but that can interoperate seamlessly to achieve the larger goals of the overall Cryptoconomy system. Exemplary system components, which are described in more detail below, may include a Web Based Application (See FIGS. 2-9), a Proprietary Cryptocurrency and Permissioned Blockchain (See FIG. 10), a Blockchain Smart Contracts Platform (See FIG. 11), a cryptocurrency-fiat exchange system, a Data Analytics Platform (See FIG. 13), and a Report Generation Tool.

The various system components, including but not limited to the Web Based Application, Proprietary Cryptocurrency and Permissioned Blockchain, Blockchain Smart Contracts Platform, cryptocurrency-fiat exchange system, Data Analytics Platform, and Report Generation Tool, may interoperate with each other through various technical protocols, channels and media. This technical interoperability may be achieved though one or more methods described below.

The software application may include various interoperable portals for different users. A non-exclusive list of examples of such users includes individual donors; corporate, institutional, and non-profit donors; trustee bank functions; funds administrator functions; and development project and aid mission participants. Distinct portals for these and other user groups may interoperate through one or more methods described below.

Web Based Application—Donor Interface

Various embodiments may include a software application that performs various functions to, among other things, provide transparency over, streamline the transfer of, and manage the oversight of funds donated to international development and humanitarian aid missions. (See FIG. 2.) The software application may be downloaded by users via the Internet to any computing device, such as a smart phone, tablet, laptop, or desktop computer. The software program may reside on servers controlled by the program's Technical Administrator. After downloading the application, in order to use the program, users may first be required to register themselves with the Technical Administrator. Registrants may be of a variety of forms, including individual persons, corporations, non-profit organizations, and government agencies.

In order to donate funds, registrants may be required to submit account information for one or more electronic payment methods. These methods may include, but may not be limited to, credit cards, bank accounts, and various forms of cryptocurrency (e.g., Bitcoin). Registrants also may be required to submit certain information related to maintaining "Know Your Customer" ("KYC") programs as required by applicable laws and regulations. The application may transfer this information to other users of the Web Based Application, such as the Technical Administrator and the Trustee Bank. Transfer of registrant information, including payment and KYC information, will be facilitated through secure methods familiar to and appreciated by those of ordinary skill in the art.

Upon successful registration, the application may provide donors with a cryptocurrency wallet that is accessible via the application. Further detail on the cryptocurrency wallets is provided in the section below entitled, "Proprietary Cryptocurrency and Permissioned Blockchain." As is appreciated by those of ordinary skill in the art, cryptocurrency has several key attributes that make it unique among payment methods. One of these attributes is the ability to assign individual units of cryptocurrency with unique identifier data that allows each individual unit to be tracked and traced in real-time as the units are transferred from one cryptocurrency wallet to another. This feature may be employed in the Proprietary Cryptocurrency used in the Cryptoconomy system.

In order to load cryptocurrency wallets with value, donors may use the Web Based Application to authorize payment of U.S. dollars in exchange for cryptocurrency. (See FIG. 12.) U.S. dollars donated through the application may be transferred to and held in a trustee bank account, as described below in the sections entitled, "Web Based Application—Trustee Bank Interface" and "Exchange of Cryptocurrency for Fiat." For each dollar donated, donors may receive one unique unit of cryptocurrency loaded to their cryptocurrency wallets. Each unique unit of cryptocurrency will be newly "minted" by the Technical Administrator just prior to being deposited into the donor's cryptocurrency wallet. (See FIG. 12.) The Permissioned Blockchain and Blockchain Smart Contracts Platform may maintain a record matching each unique unit of cryptocurrency with specific donations made by donors at a particular moment in time. This recordkeeping process is described in more detail in the sections below entitled "Proprietary Cryptocurrency and Permissioned Blockchain" and "Blockchain Smart Contracts Platform."

The application may allow donors to name their cryptocurrency wallets, and even to name the individual units of cryptocurrency that they have purchased. The technology enabling these features is described in the section below entitled, "Proprietary Cryptocurrency and Permissioned Blockchain." For example, a donor agency may choose to name its wallet and cryptocurrency units in a manner that identifies the agency. In another example, an individual may choose to name her wallet and cryptocurrency units using a "code word" that allows her to reveal her association with the wallet and cryptocurrency to others at her own discretion.

The application may allow donors to donate units of cryptocurrency residing in their cryptocurrency wallets to one of several development and aid missions registered to receive funds through the Cryptoconomy system. Donors may be able to use the application to search for the development or aid mission of their choosing, and may be able to transfer cryptocurrency to particular missions in specific amounts.

As explained above, the application may interface and interoperate with other components of the system, including the Permissioned Blockchain, Blockchain Smart Contracts Platform, Data Analytics Platform, and Report Generation Tool. The data generated through these components of the system may be displayed to donors through the Web Based Application. The scope and extent of the data displayed to any particular donor may vary based on the permissions granted to the donor by the Technical Administrator and Project Administrator. At a minimum, the Web Based Application will enable each donor to view the transaction history of each unit of cryptocurrency that the donor originally purchased and transferred into the Cryptoconomy system, as the unit is transferred between and among various cryptocurrency wallets held by various project participants. In the event that a unit of cryptocurrency is exchanged for fiat funds, the donor will be able to see, through the Web Based Application, data concerning the exchange. Such data may include the recipient, amount, and purpose for the fiat exchange. (An example of this function is depicted at 110 in FIG. 3.)

Donors may perceive several benefits to donating funds through the Cryptoconomy system instead of other traditional donation channels. One perceived benefit may be the increased ability to view the specific recipients of their donated funds. Other perceived benefits may be that the timestamped transaction data provides donors with confidence that donated funds are delivered to missions in a timely, secure manner. These and other perceived benefits may enhance the level of trust and commitment donors have to the project mission, which may in turn lead to increased donations.

Web Based Application—Technical Administrator Interface

Ultimate control over the various components of the Cryptoconomy system, including the Web Based Application, may reside with a Technical Administrator. The Web Based Application may be configured with an interface specifically intended for the Technical Administrator. (Various embodiments of this Technical Administrator portal are depicted at 120 in FIGS. 1-7 and FIGS. 11-12.) This interface may interoperate with the various components of the system and may display data pulled from those components in several mediums and formats intended to assist the Technical Administrator in understanding various aspects of the funds flow and behaviors of the project participants. For example, the application may display for the Technical Administrator data on the donors, amounts, and recipients of cryptocurrency donations during particular time periods. In another example, the application may display for the Technical Administrator data on the amounts spent by a particular contractor on various supplies, subcontracted services, and skilled and unskilled labor during a particular time period of a development project.

The Web Based Application also may allow the Technical Administrator to set permissions on the data that can be viewed by the various participants in the Cryptoconomy system, such as donors, contractors, non-governmental organizations, and government agencies. In addition, the Web Based Application may allow the Technical Administrator to set permissions on the access to and use of the data among its own functional areas, and may allow the configuration of other internal control mechanisms. The Web Based Application also may enable the Technical Administrator to perform various other tasks related to its role in the Cryptoconomy system. (Examples of functions available to the Technical Administrator through the Web Based Application are depicted at 130 in FIG. 4.)

The Technical Administrator will also retain ultimate control over the other components of the Cryptoconomy system, such as the Proprietary Cryptocurrency, Permissioned Blockchain, Blockchain Smart Contracts Platform, Data Analytics Platform, and Report Generation Tool. The Technical Administrator may be allowed to perform actions over these component systems through the Web Based Application.

One critical aspect of the Technical Administrator's authority over the Cryptoconomy system is the Technical Administrator's ability to prevent, block, reverse, freeze, or otherwise exercise authority over cryptocurrency transactions and the release of U.S. dollars from the escrow account held at the trustee bank. (Example embodiments of this authority are depicted at 140 in FIGS. 2-7.) The Technical Administrator may be able to execute actions such as these through the Web Based Application. These actions may be executed through methods familiar to and appreciated by those of ordinary skill in the art.

Web Based Application—Trustee Bank Interface

The Web Based Application may be configured with an interface specifically intended for a trustee bank. (See FIG. 5.) U.S. dollars remitted by donors via the Web Based Application may be transferred to and held in an escrow account at a trustee bank. (Example embodiments of this are depicted at 150 in FIGS. 3, 5, and 12.) Although the trustee bank will not have control over any cryptocurrency wallets, through the Web Based Application the bank may view the cryptocurrency wallets of all participants in the Cryptoconomy system, including donors, the Project Administrator, contractors, subcontractors, suppliers, and laborers. (See 160 in FIG. 5.) Because each unit of cryptocurrency is earmarked to a donated U.S. dollar and minted at the time of donation, at any given point in time, the total units of cryptocurrency in the wallets of all project participants will equal the total U.S. dollars held by the trustee bank in the escrow account.

The Web Based Application may interface and interoperate with other components of the system, including the Permissioned Blockchain, Blockchain Smart Contracts Platform, Data Analytics Platform, and Report Generation Tool. The data generated through these components of the system may be displayed to the trustee bank through the Web Based Application. (See FIG. 5.) The trustee bank may use this data to perform various duties related to its role as trustee, such as performing a reconciliation of the cryptocurrency outstanding in the wallets of the Cryptoconomy participants with the U.S. dollars residing in the escrow account. To enhance the level of assurance of the reconciliation, the trustee bank may also run a node on the Permissioned Blockchain, as discussed below in the section entitled, "Proprietary Cryptocurrency and Permissioned Blockchain." (An example of a node that may be run by a trustee bank is depicted at 170 in FIG. 10.)

The Cryptoconomy system may include a cryptocurrency wallet that is assigned to the trustee bank, but over which the trustee bank does not exercise any control. Control over this cryptocurrency wallet may reside with the Technical Administrator. When a unit of cryptocurrency has completed its flow through the Cryptoconomy system, and is exchanged for fiat funds, the unit of cryptocurrency may be transferred to and may permanently reside in the cryptocurrency wallet assigned to the trustee bank. In this way, each U.S. dollar released from the escrow account may be matched to a unit of cryptocurrency residing in the trustee bank's cryptocurrency account.

The trustee bank may use its internal bank records to reconcile disbursements of U.S. dollars from the escrow account with units of cryptocurrency residing in the bank's assigned cryptocurrency wallet. The Web Based Application may display this data for the trustee bank, as well as for other participants in the Cryptoconomy system that have permission to access the data. For example, when a specific unit of cryptocurrency is exchanged for fiat cash, the donor of that specific unit of cryptocurrency may have permission to access data regarding the exchange transaction. The process governing the exchange of cryptocurrency for U.S. dollars, and the release of U.S. dollars from the escrow account managed by the trustee bank, is explained in more detail below in the section entitled, "Exchange of Cryptocurrency for Fiat."

The Web Based Application may be configured to store and display KYC information provided by donors at the time of registration that is relevant to the trustee bank's reporting and recordkeeping requirements under applicable laws and regulations. (See 180 in FIG. 5.)

Web Based Application—Blockchain Interface and Cryptocurrency Mint

Among other components of the Cryptoconomy system, the Web Based Application may interoperate and interface with the Proprietary Cryptocurrency, Permissioned Blockchain and Blockchain Smart Contracts Platform. (See FIG. 2.) As may be appreciated by those of ordinary skill in the art, all data displayed by the Web Based Application may be produced by and ultimately reside in and among the Proprietary Cryptocurrency, Permissioned Blockchain, and Blockchain Smart Contracts Platform. The Web Based Application may pull and display data from these system components through methods familiar to and appreciated by those of ordinary skill in the art.

Among other features of the Web Based Application, the application may include a portal that can be accessed by certain participants in the Cryptoconomy system and that displays data related to the Cryptocurrency Mint. As may be appreciated by those of ordinary skill in the art, there are various methods of "minting" new units of cryptocurrency. In one example of the Cryptoconomy system, new units of cryptocurrency will be minted through a function of the Blockchain Smart Contracts Platform that mints a new unit of cryptocurrency in a one-to-one ratio for every U.S. dollar donated through the Web Based Application and remitted to the escrow account held by the trustee bank. The process by which this occurs is described in more detail below in the section entitled, "Blockchain Smart Contracts Platform." (See FIG. 12.)

When new U.S. dollars are donated to the Cryptoconomy system, and when new units of cryptocurrency earmarked to those dollars are minted through the Blockchain Smart Contracts Platform, the Web Based Application may pull, aggregate, sort, and display data from internal bank systems at the trustee bank, and from the Blockchain Smart Contracts Platform, to show the minting of new units of cryptocurrency.

Web Based Application—Project Administrator Interface

The Web Based Application may be configured with an interface specifically intended for the Project Administrator or Project Administrators. (See FIG. 6.) There may be multiple Project Administrators, as the Cryptoconomy system may be used simultaneously by multiple entities engaged in international development and humanitarian aid missions. As described above, donors using the Cryptoconomy system may utilize a search function in the Web Based Application to select specific development and aid missions to which to contribute their cryptocurrency funds. When a donor transfers cryptocurrency funds to a specific entity or project, the Project Administrator for the entity or project will receive an automated notice through the web based portal (See 190 in FIG. 6), and will be able to see the funds deposited into its cryptocurrency wallet. The method by which the cryptocurrency is transferred from a donor wallet to a Project Administrator wallet is described below in the section entitled, "Proprietary Cryptocurrency and Permissioned Blockchain." The automated notice is generated and sent to the Project Administrator through methods familiar to and appreciated by those of ordinary skill in the art.

After receiving donated funds in the form of cryptocurrency, the Project Administrator may transfer the cryptocurrency funds to wallets controlled by contractors with which it has engaged to perform work related to the development or relief mission. The method by which the cryptocurrency is transferred from a Project Administrator wallet to a contractor wallet is described below in the section entitled, "Proprietary Cryptocurrency and Permissioned Blockchain." The Web Based Application may interface and interoperate with the Proprietary Cryptocurrency and Permissioned Blockchain to sort and display data related to the transfer of cryptocurrency. After a unit of cryptocurrency has been transferred from the Project Administrator to a contractor, the cryptocurrency may subsequently be transferred from the contractor to, between, and among various other project participants, such as subcontractors, suppliers, and skilled and unskilled laborers. (Example embodiments of a transfer of cryptocurrency are depicted at 200 in FIG. 1 and in FIG. 10.)

The data derived from the Proprietary Cryptocurrency, Permissioned Blockchain, and Blockchain Smart Contracts Platform, and displayed to the Project Administrator via the Web Based Application, may be analyzed in various ways to assist the Project Administrator in managing the development or aid mission. (See FIG. 13.) These data analytics are discussed in more detail below, in the section entitled "Data Analytics Platform."

Certain reports may be generated from the data produced by the Proprietary Cryptocurrency, Permissioned Blockchain, Blockchain Smart Contracts Platform, and Data Analytics Platform. These reports may be generated through the Report Generation Tool, as described below in the section entitled, "Report Generation Tool." (See FIG. 13.) These reports may assist in informing stakeholders of the development or aid mission, including donors, the Project Administrator, and other stakeholders. The reports also may be displayed to the Project Administrator through the Web Based Application.

Certain cryptocurrency transactions may be disallowed and blocked by setting automated rules and restrictions using the Blockchain Smart Contracts Platform. (See FIG. 11.) An example of a type of transaction that may be blocked is an attempted transfer of funds from a donor to a contractor, a laborer to a subcontractor, or a supplier to a Project Administrator. These transactions may be blocked because they may not have an apparent business or economic purpose related to the development or aid mission. Similarly, certain transactions may require approval from one or more project participants, such as the Project Administrator or Technical Administrator, before the transactions are allowed to clear. The method by which cryptocurrency transactions may be automatically blocked or flagged for approval is described below in the section entitled, "Blockchain Smart Contracts Platform." The Web Based Application may interface and interoperate with the Blockchain Smart Contracts Platform to provide automated notices of these blocked and flagged transactions to the Project Administrator, Technical Administrator, or other parties.

Web Based Application—Participant Interface

The Web Based Application may be configured with an interface specifically intended for paid participants in the international development and humanitarian aid mission. (See FIG. 7.) These participants may include various contractors, subcontractors, suppliers, and skilled and unskilled laborers with expertise in various fields and engaged by the Project Administrator. The Web Based Application may allow these project participants to access their cryptocurrency wallets and send and receive funds to and from those wallets. (An example embodiment of this is depicted at 210 in FIG. 7.) The methods by which the cryptocurrency is sent and received are described in the section below entitled, "Proprietary Cryptocurrency and Permissioned Blockchain." The data on these transactions may be pulled from the Proprietary Cryptocurrency, Permissioned Blockchain, and Blockchain Smart Contracts Platform, and displayed to the project participants via the Web Based Application.

The data derived from the Proprietary Cryptocurrency, Permissioned Blockchain, and Blockchain Smart Contracts Platform, and displayed to the project participants via the Web Based Application, may be analyzed in various ways to assist the project participants in managing the development or aid mission. (See FIG. 13.) These data analytics are discussed in more detail below, in the section entitled "Data Analytics Platform." The Web Based Application may display results from the Data Analytics Platform.

Certain reports may be generated from the data produced by the Proprietary Cryptocurrency, Permissioned Blockchain, Blockchain Smart Contracts Platform, and Data Analytics Platform. (See FIG. 13.) These reports may be generated through the Report Generation Tool, as described below in the section entitled, "Report Generation Tool." These reports may assist in informing stakeholders of the development or aid mission, including the project participants. The reports may include copies of relevant executed contracts. The reports may be displayed to the project participants through the Web Based Application through methods familiar to and appreciated by those of ordinary skill in the art.

Propietary Cryptocurrency and Permissioned Blockchain

The exemplary Cryptoconomy system described herein may be based on a new cryptocurrency, referred to herein as "Proprietary Cryptocurrency," and a new blockchain, referred to herein as a "Permissioned Blockchain." As is appreciated by those of ordinary skill in the art, blockchain technology may be used to create and support a Proprietary Cryptocurrency, where access to the cryptocurrency is restricted to users that are granted certain permission rights. This type of private, or permissioned, cryptocurrency may be the basis of the cryptocurrency used in the Cryptoconomy system. As is also appreciated by those of ordinary skill in the art, one use of cryptocurrency is referred to as "tokenization," which is where a unit of cryptocurrency has no inherent value of its own, but rather serves as a symbol or "token" of something else that is of value. The cryptocurrency used in the Cryptoconomy system may similarly have no inherent value of its own. Rather, each unit of cryptocurrency may act as a token or symbol representing one U.S. dollar that has been donated to an international development or humanitarian aid mission. Access to the cryptocurrency may be restricted to those who have been granted permission to participate in the Cryptoconomy system (e.g., donors, relief agencies, contractors, subcontractors). Permission to access the system ultimately may be granted by the Technical Administrator.

The Technical Administrator may control access rights to the Cryptoconomy system by issuing and maintaining control over the cryptocurrency wallets used by system participants. (Example embodiments of this authority are depicted at 140 in FIGS. 2-7.) As is appreciated by those of ordinary skill in the art, there are a variety of methods that may be used to support cryptocurrency wallets. For example, one common distinction is between so called "cold storage," where a wallet is stored on a hardware device, and so called "hot storage," where a wallet is stored on a network supported by one or more servers. In the Cryptoconomy system, the cryptocurrency wallets may be stored using "hot storage" on a network supported by servers controlled by the Technical Administrator, as well as by one or more additional servers controlled by entities that may run nodes supporting the blockchain.

Another method by which the Technical Administrator may control access rights to the Cryptoconomy system is through multi-signature technology. As is appreciated by those of ordinary skill in the art, multi-signature technology allows for cryptocurrency wallets to be configured such that multiple entities, using multiple "private keys," are required to approve a transaction before cryptocurrency is transferred from the wallet. In the Cryptoconomy system, the Technical Administrator may exercise multi-signature authority over all cryptocurrency wallets used in the system. The Technical Administrator may in some cases exercise its multi-signature authority manually. However, in most cases the Technical Administrator may exercise its multi-signature authority through the use of smart contracts, as described in more detail below in the section entitled "Blockchain Smart Contracts Platform." (An example embodiment of multi-signature authority is depicted at 220 in FIG. 1.)

Other participants in the Cryptoconomy system, such as the Project Administrator, may also be granted multi-signature authority over some of the wallets. The Technical Administrator and other project participants may be provided with multi-signature authority over one or more cryptocurrency wallets through methods familiar to and appreciated by those of ordinary skill in the art.

As is appreciated by those of ordinary skill in the art, there are various methods of generating, or "minting," new cryptocurrency units in a private cryptocurrency system. In the Cryptoconomy system, the Technical Administrator may have the sole ability to "mint" new units of cryptocurrency. However, before a new unit of cryptocurrency is minted by the Technical Administrator, the action may have to be reviewed and approved by one or more other entities. This approval process may be implemented using the Blockchain Smart Contracts Platform and is explained more fully in that section below. The cryptocurrency units may be "minted" by the Technical Administrator through methods familiar to and appreciated by those of ordinary skill in the art.

Figure 1:
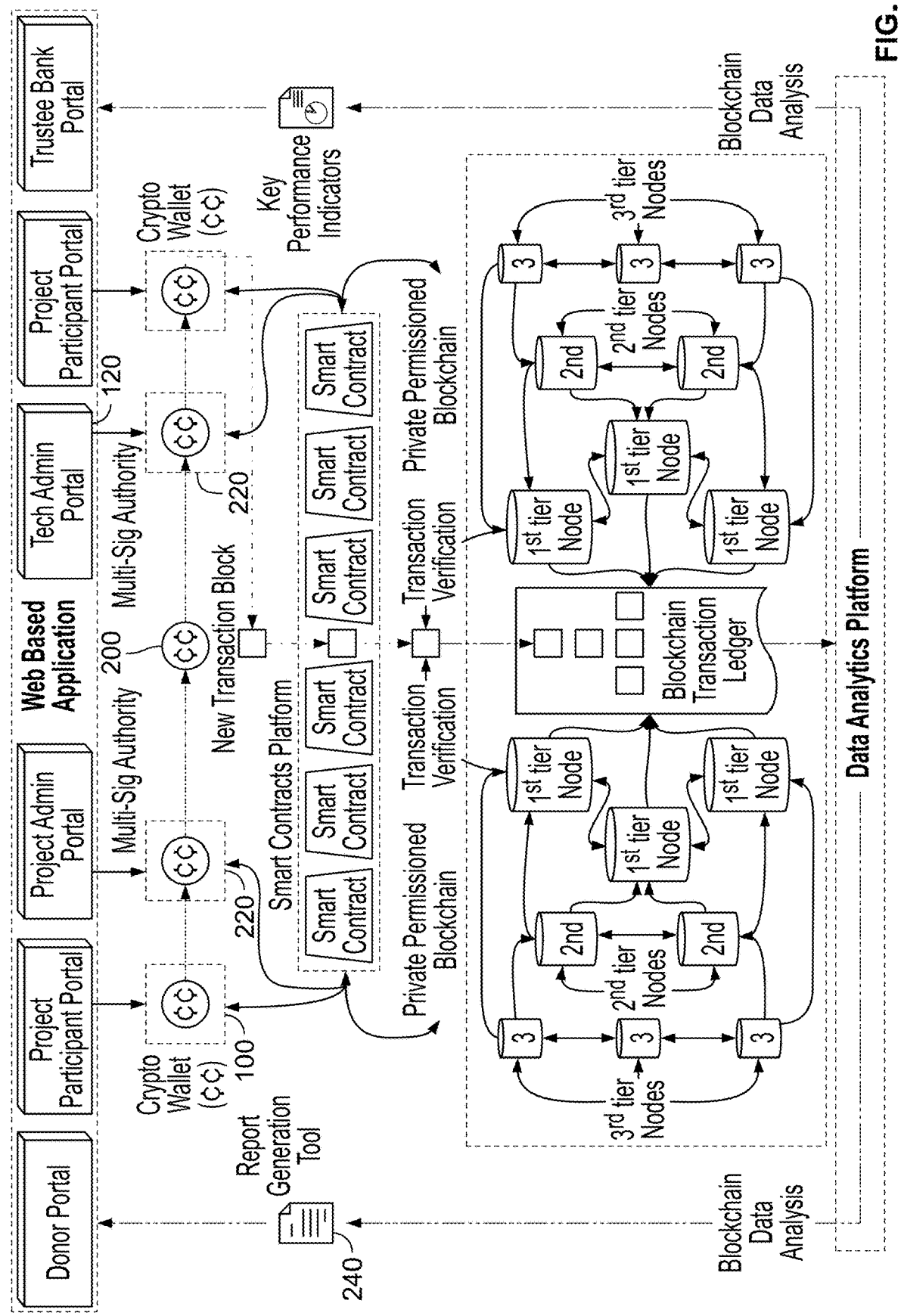
FIG. 1 is a diagram showing one example of the overall system design, including relationships between and among certain system components, roles played by various system components and project participants, and the flow of data and computing resources through the system.
Figure 2:
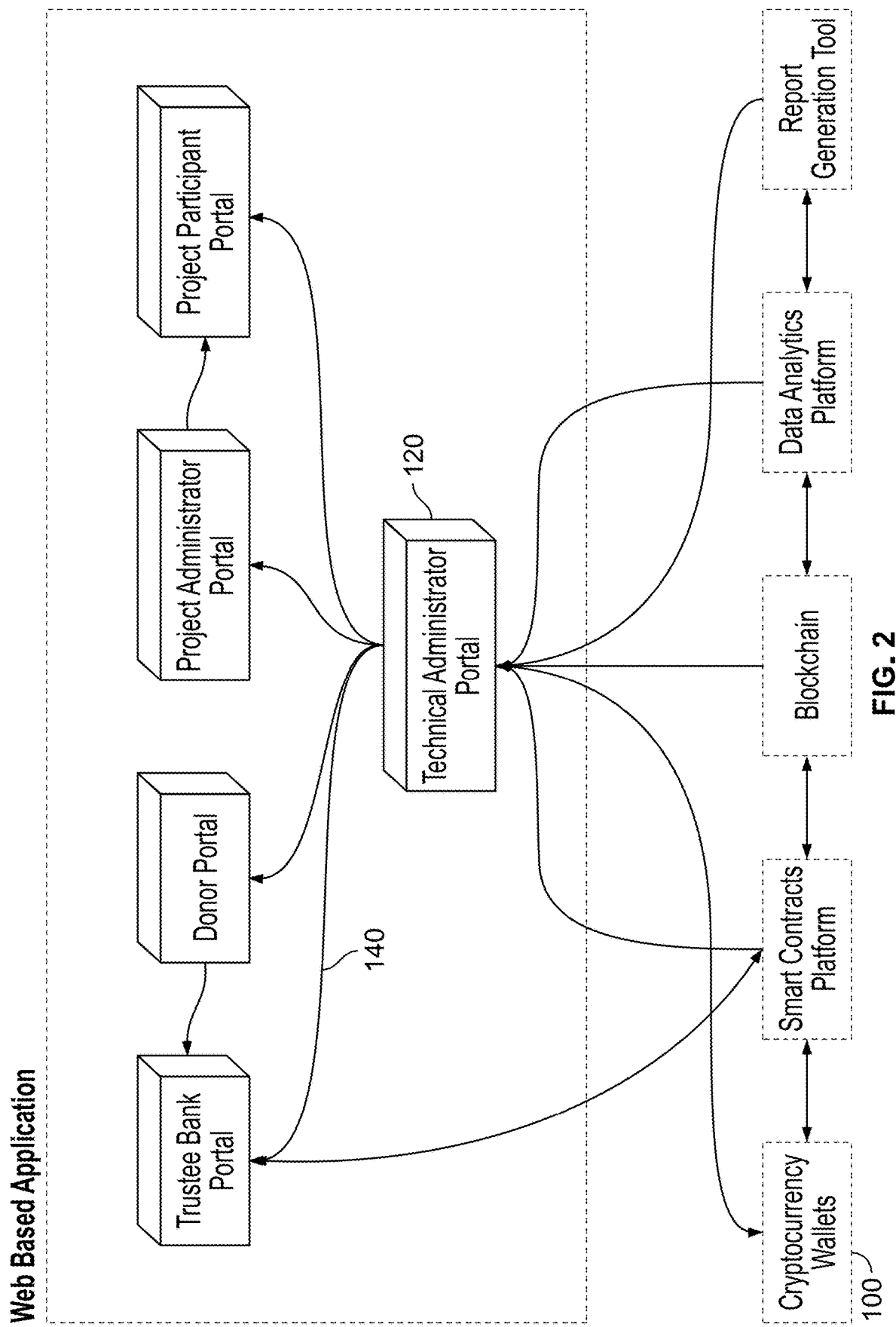
FIG. 2 is a diagram showing one example of the basic design of a Web Based Application, including a depiction of key system participants and authorities and permissions between and among participants.
Figure 10:
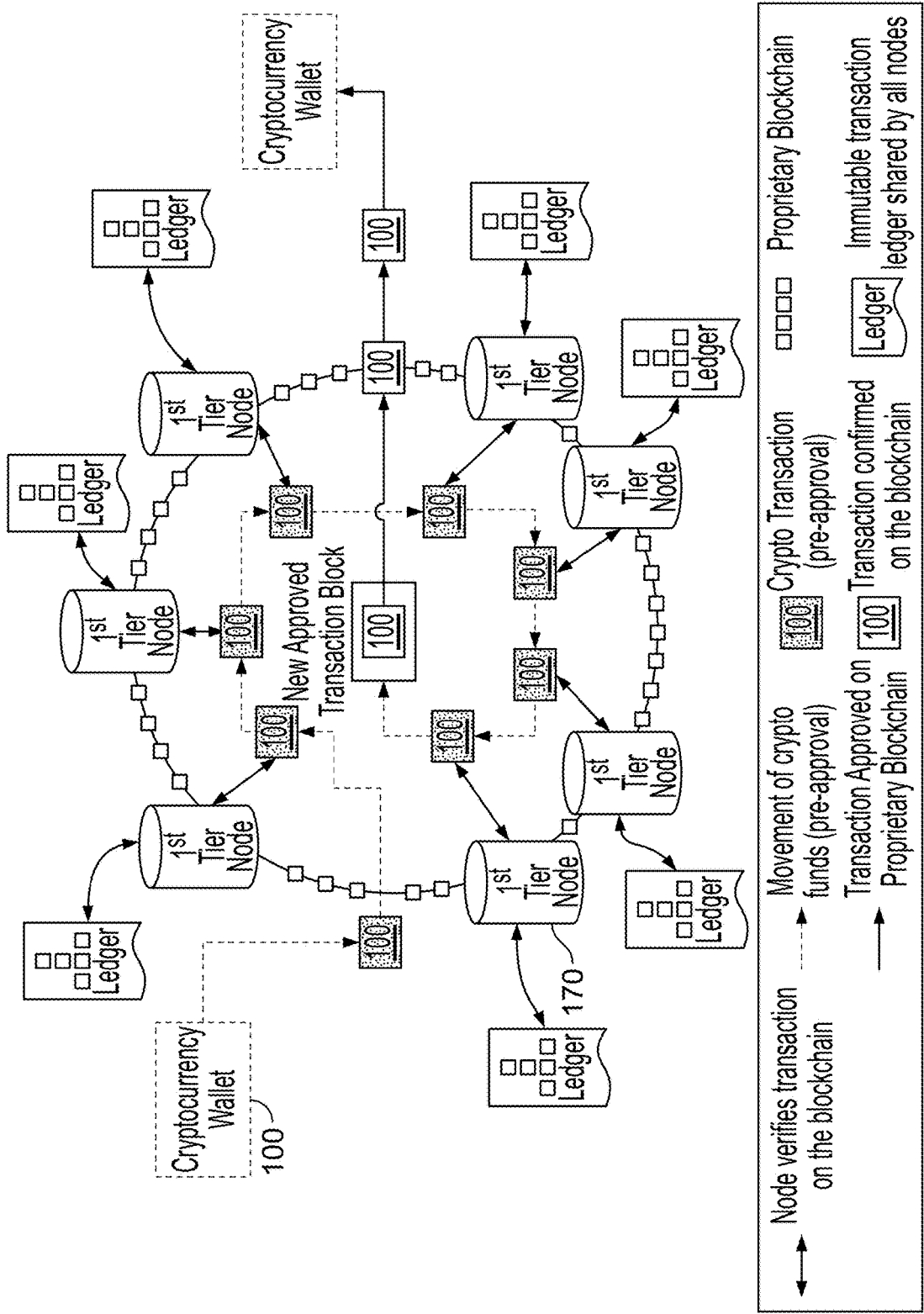
FIG. 10 is a diagram showing one example of components and functions of the Proprietary Cryptocurrency and Permissioned Blockchain.

The Proprietary Cryptocurrency used in the Cryptoconomy system may reside on a private, Permissioned Blockchain. As is appreciated by those of ordinary skill in the art, a blockchain may be public, where use of the system may be unrestricted; or it may be private, where use of the system is restricted to authorized users. As is also appreciated by those of ordinary skill in the art, a blockchain may be "permissionless," where anyone may contribute computing resources and act as a "node" in support of the network; or it may be "permissioned," where those running the "nodes" that support the network are restricted to a group of authorized individuals or entities. As discussed above, the Cryptoconomy system may be a private blockchain that may be accessed only by authorized participants in the Cryptoconomy system. Similarly, the blockchain that underpins the Cryptoconomy system may be a Permissioned Blockchain, where the nodes are limited to a restricted group that collectively contributes the computing resources to support the network. (Example embodiments of the Private Permissioned Blockchain are depicted in FIGS. 1 and 10.)

Figure 8:
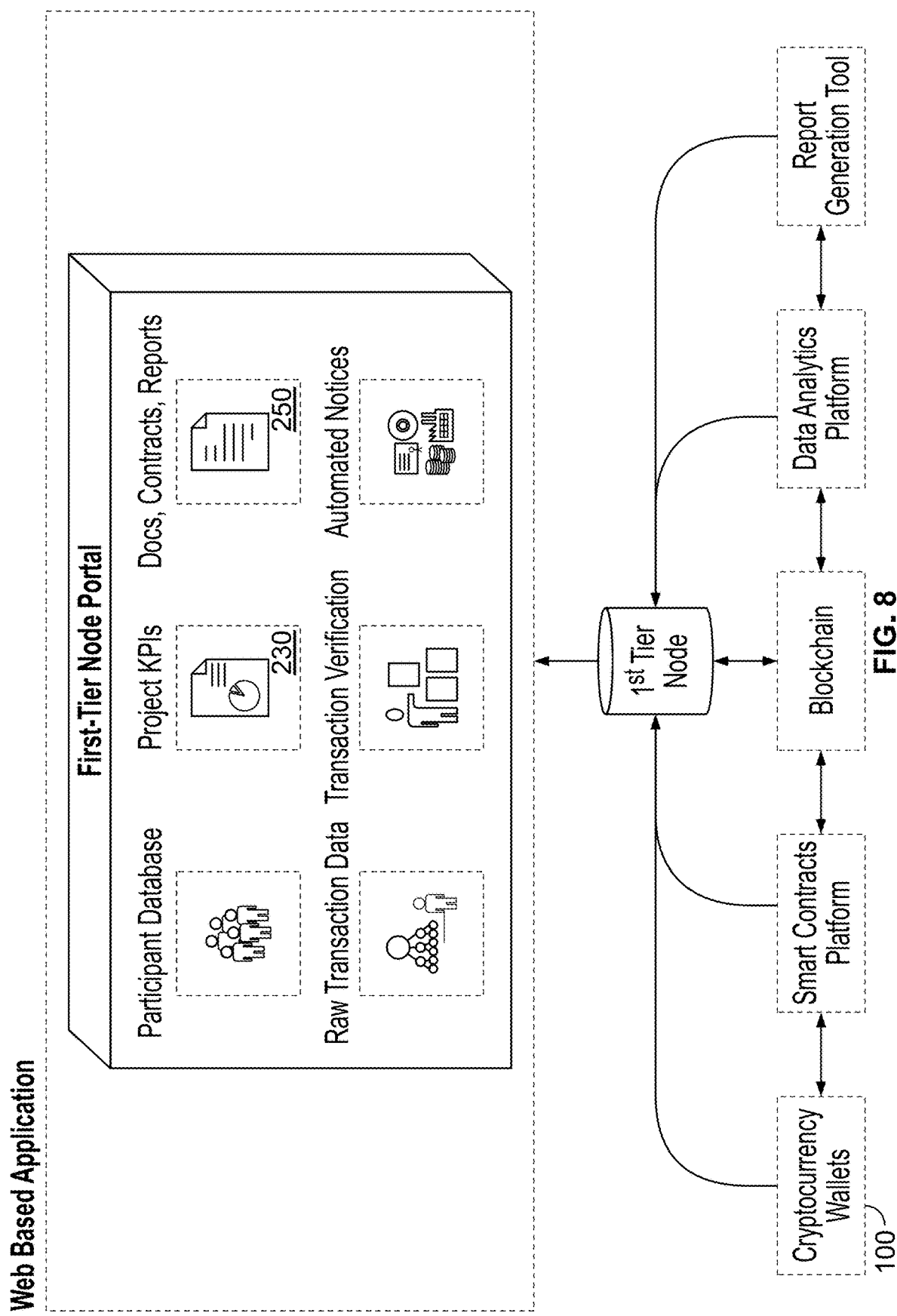
FIG. 8 is a diagram showing one example of functions of the First-Tier Node portal that are accessed through the Web Based Application.

There may be several tiers of nodes that contribute computing resources to the Cryptoconomy blockchain, with each tier providing different levels of network support and having different levels of data access rights. For example, there may be a first tier of nodes that collectively run over 51-percent of the computing power supporting the network. The entities operating the first tier of nodes may be founding members that originally built and implemented the Cryptoconomy system. This first tier may collectively operate a group of nodes that is capable of supporting one hundred percent of the network, if needed. The blockchain may be configured such that each of the first tier nodes must approve a transaction before the transaction clears and is posted to the blockchain ledger. Similarly, each entity running one of the first tier nodes may have multi-signature authority over cryptocurrency transactions. In addition, each of the first tier nodes may have unrestricted access to the blockchain transaction data. The first tier of nodes may include the Technical Administrator. (Example embodiments of the First-Tier nodes are depicted in FIGS. 1 and 8.)

A second tier of nodes may along with the third tier collectively contribute forty-nine percent or less of the network computing power. This second tier of nodes may have a lesser level of contribution to the blockchain, and may receive a lesser level of access to the data generated by the blockchain. For example, the second tier nodes may not be involved in verifying cryptocurrency transactions. Similarly, the second tier nodes may have restricted access to the data; for example, the names of some of the parties engaged in various cryptocurrency transactions may be masked from the second tier nodes.

Figure 9:
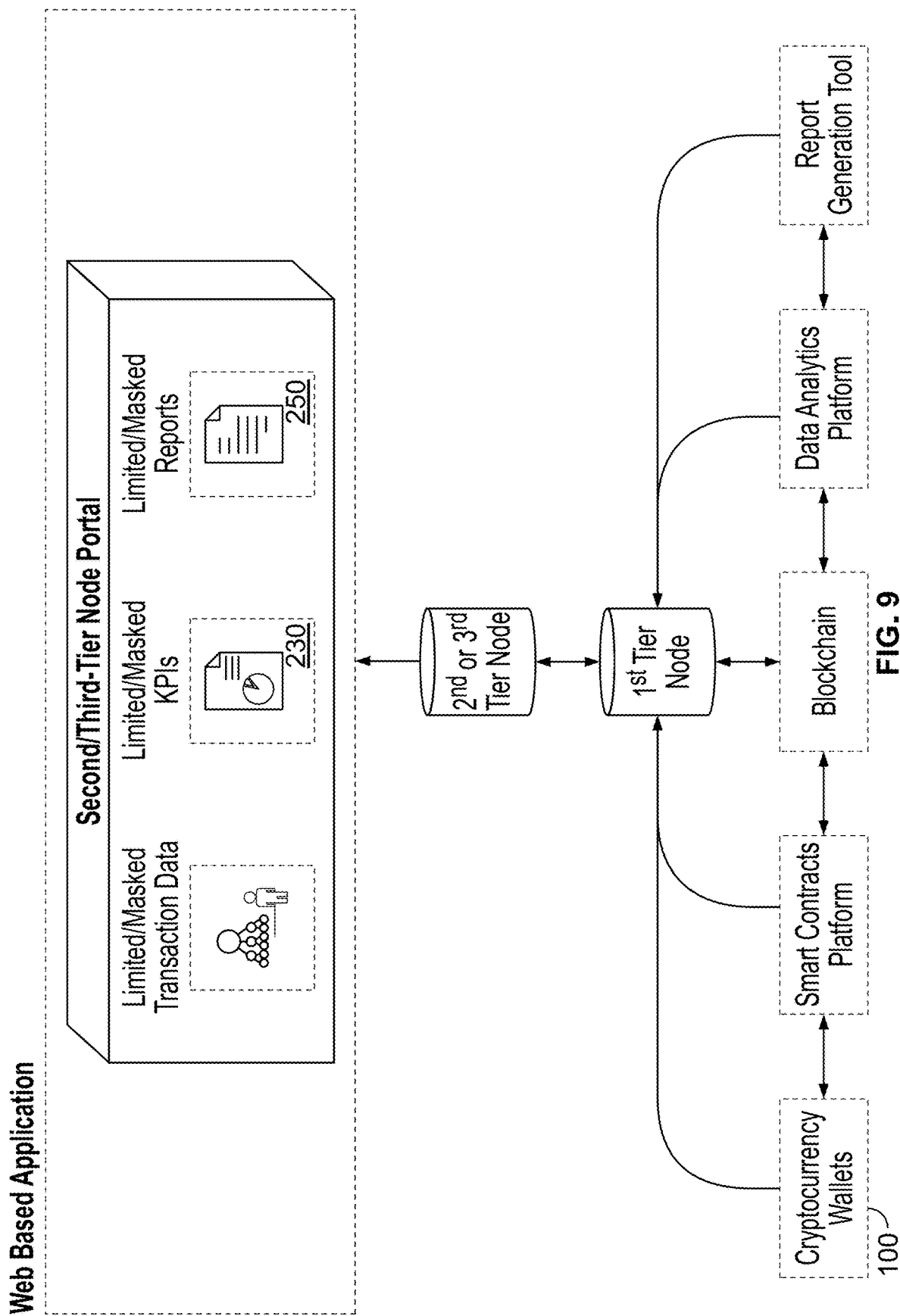
FIG. 9 is a diagram showing one example of the functions of the Second- and Third-Tier Node portals that are accessed through the Web Based Application.

A third tier of nodes may along with the second tier collectively contribute forty-nine percent or less of the network computing power. Like the second tier of nodes, this third tier of nodes may have a lesser level of contribution to the blockchain, and may receive a lesser level of access to the data generated by the blockchain. For example, the third tier may not be involved in verifying cryptocurrency transactions. The third tier also may have restricted access to the data; for example, the third tier may only have access to "masked" versions of the data, where the identities of the various network participants are unknown. As another example, the third tier of nodes may have access only to a certain portion of the data, such as transactions involving only a select category of project participants. (Example embodiments of the Second-Tier and Third-Tier nodes are depicted in FIGS. 1 and 9.)

The various tiers of nodes may have access to both the "raw" data produced by the Permissioned Blockchain, as well as various forms of data available through the Web Based Application. The Permissioned Blockchain may be configured such that various levels of nodes may contribute different levels of network support to the blockchain, and may have different levels of access and restriction to the data stored on the blockchain.

Blockchain Smart Contracts Platform

According to one embodiment, the blockchain underpinning the Cryptoconomy system may be configured with a proprietary system of smart contracts. As is appreciated by those of ordinary skill in the art, smart contracts effectively may operate as "rules" that automate certain cryptocurrency transactions that may take place on a blockchain. In the Cryptoconomy system, the Blockchain Smart Contracts Platform may play a critical role in implementing various aspects of the system that may limit fraud, waste and abuse. One such aspect is to configure the blockchain with a smart contracts system that only allows certain approved transactions to occur. The Blockchain Smart Contracts Platform may be configured such that different restrictions apply to different types of participants in the Cryptoconomy system. For example, donors of development and relief funds may be allowed to transfer cryptocurrency only to approved Project Administrators; Project Administrators may be allowed to transfer cryptocurrency only to prime contractors approved to work on specific projects; prime contractors may be allowed to transfer cryptocurrency only to approved subcontractors; and subcontractors may be allowed to transfer cryptocurrency only to approved suppliers, skilled laborers, and unskilled laborers. The Blockchain Smart Contracts Platform may be configured to block unapproved transactions.

The Blockchain Smart Contracts Platform also may be configured to allow certain transactions to clear only upon the presence of certain conditions. This is especially true in the case of "cash out" transactions, where a project participant attempts to exchange cryptocurrency for U.S. dollars. For example, in the case of a construction contract, the Blockchain Smart Contracts Platform may be configured so that the contractor may be limited in the amount of cryptocurrency it may exchange for U.S. dollars until verification that the work is complete and has passed an inspection has been loaded to the blockchain.

Figure 11:
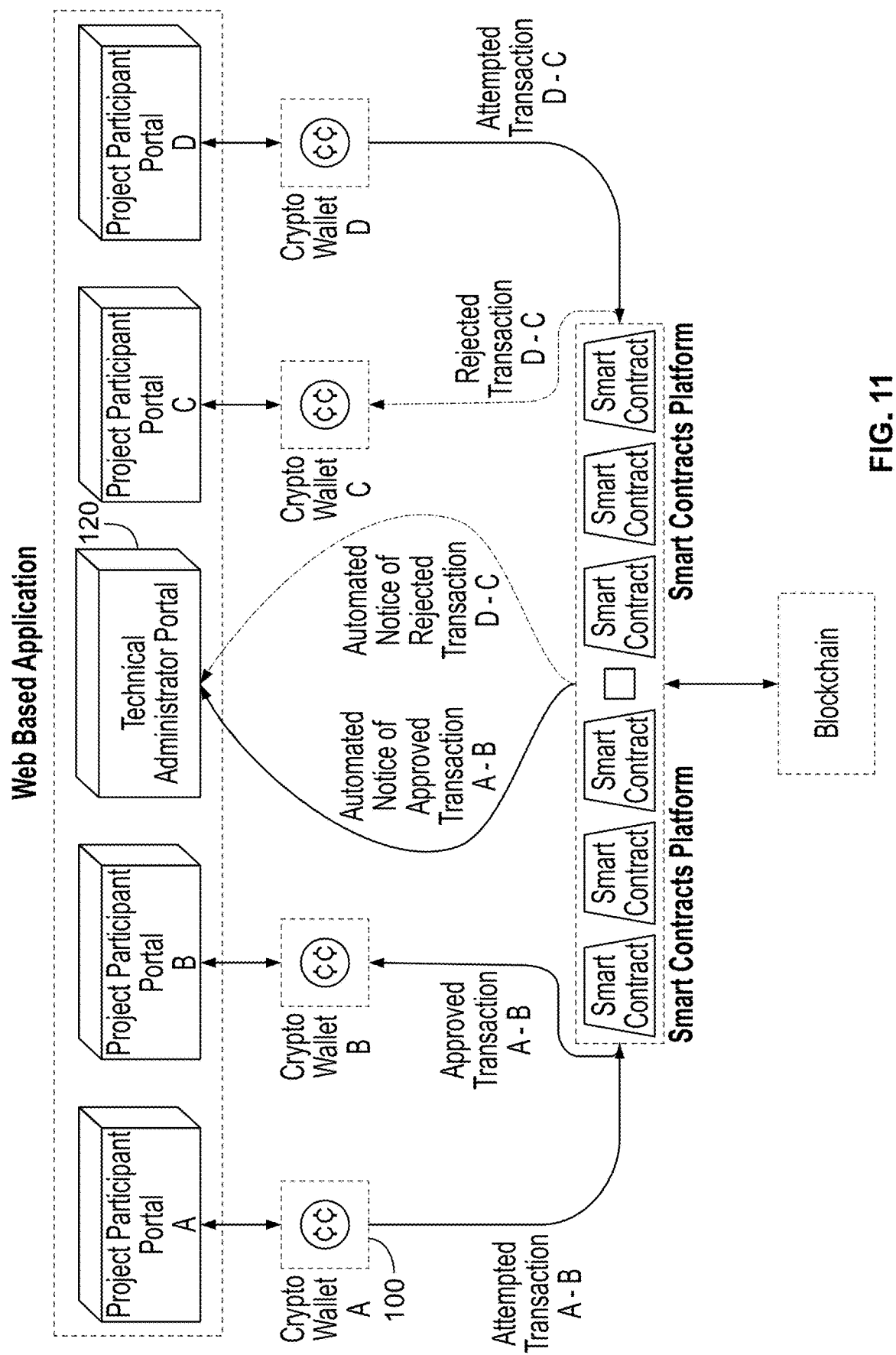
FIG. 11 is a diagram showing one example of a function of the Blockchain Smart Contracts Platform—to automatically approve or reject transactions between project participants based on "rules" and "permissions" configured in the smart contracts, and to send automated notices of transaction approval/rejection.

In another example, humanitarian aid recipients who have received cryptocurrency representing hotel benefits may be automatically prevented from receiving cryptocurrency representing rental assistance. In a third example, aid recipients of cryptocurrency funds intended for residents of a certain state may be allowed to spend the funds at approved vendors or exchange the funds for U.S. dollars only after documentation evidencing their residence in a certain state is verified and loaded to the blockchain. In a final example, cryptocurrency representing funds allocated for small or minority owned businesses may be exchanged for U.S. dollars only after evidence of a participant's small or minority owned status is verified and recorded on the blockchain. (Example embodiments of a Blockchain Smart Contracts Platform are depicted in FIGS. 1, 11, and 12. FIG. 11 contains depictions of how certain transactions may be approved by the Blockchain Smart Contracts Platform, and how other transactions may be rejected by the Blockchain Smart Contracts Platform. FIG. 11 also contains a depiction of how the Blockchain Smart Contracts Platform may provide the Technical Administrator with automated notices of approved and rejected transactions.)

The Blockchain Smart Contracts Platform may be programed to block certain unauthorized transactions, and to allow certain transactions to clear only upon the presence of specified conditions, through methods familiar to and appreciated by those of ordinary skill in the art.

A final example of how the Blockchain Smart Contracts Platform may be configured to manage the Cryptoconomy system concerns the minting of new cryptocurrency. As explained above, in the Cryptoconomy system, a new unit of cryptocurrency is minted for every new U.S. dollar that is donated through the Web Based Application. Also as explained above, U.S. dollars donated through the Web Based Application are received by a trustee bank and stored in an escrow account, while the cryptocurrency representing the U.S. dollars are minted by the Technical Administrator. In order to manage and automate this process, the Blockchain Smart Contracts Platform may be configured such that when the trustee bank receives donated funds, the blockchain node run by the trustee bank sends a message via the smart contracts system that verifies the U.S. dollars have been received. The Blockchain Smart Contracts Platform may be configured such that once the message indicating receipt of the U.S. dollars is verified by all of the first tier blockchain nodes, the Technical Administrator's systems automatically create the newly minted cryptocurrency units representing those U.S. dollars and deposit the cryptocurrency in the wallet of the appropriate donor. (An example embodiment of this process is depicted in FIG. 12.)

Exchange of Cryptocurrency for Fiat

There may be several key advantages to using cryptocurrency as a "token" or "voucher" for U.S. dollars maintained in an escrow account. One key advantage is that the funds may generate interest while remaining in the escrow account. Another is that the funds will be less likely to be lost to fraud, waste, and abuse. Still another advantage is that by enabling transactions in cryptocurrency, development and aid missions are able to transfer funds faster and at significantly less cost as compared to transactions conducted through traditional banking channels.

At a certain point in a development or relief project, certain project participants may be allowed to redeem units of cryptocurrency for U.S. dollars or other fiat currency. As is appreciated by those of ordinary skill in the art, the exchange of cryptocurrency for U.S. dollars may be conducted through a variety of methods. Cryptocurrency being exchanged may be sent to the cryptocurrency account of the trustee bank, as described above. Once the exchange request has been approved, the trustee bank may remit the U.S. dollars to the project participant via various remittance channels. Some of these include mobile money transfers, wire transfers, and transfers to registered agents authorized to distribute cash. Additional remittance channels may involve converting the U.S. dollars to another form of cryptocurrency, such as Bitcoin. Yet another channel may involve the trustee bank remitting the U.S. dollars directly to a merchant or service provider that provides goods or services, in lieu of cash, to the individual making the "cash out" request.

Data Analytics Platform

Figure 13:
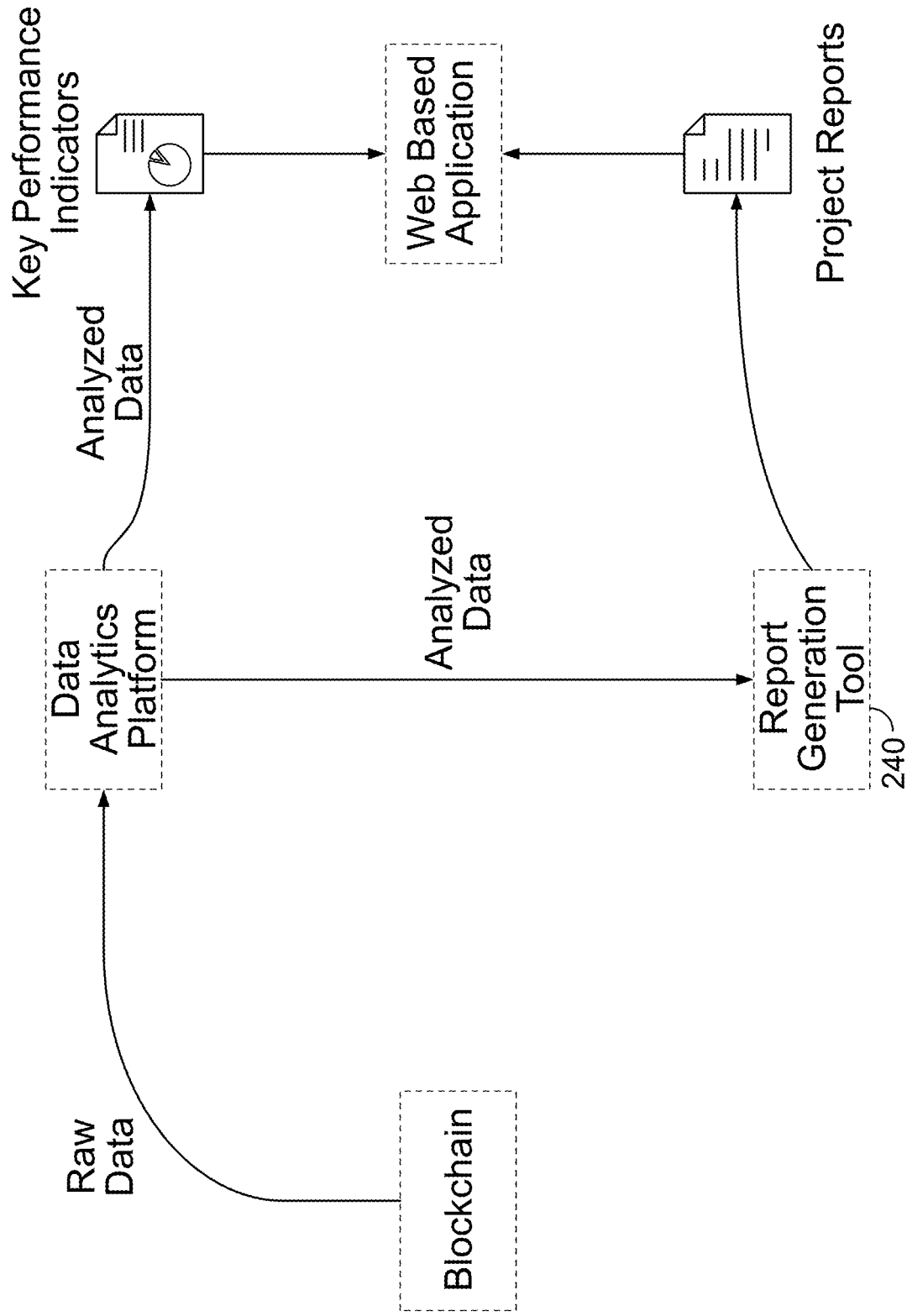
FIG. 13 is a diagram showing one example of the function of the Data Analytics Platform in receiving raw data from the Permissioned Blockchain, analyzing the data, and producing measured outputs that feed into the Web Based Application.

The Cryptoconomy system may include a Data Analytics Platform that analyzes, sorts, and displays data derived from the blockchain. (Example embodiments of the Data Analytics Platform are depicted in FIGS. 1 and 13.) These data analytics may be provided to various project participants in varying degrees, based on permission rights granted by the Technical Administrator and others. Participants in the Cryptoconomy system may use the data to inform their decision making and improve the overall management of the project. Because the blockchain may enable real-time access to transaction data, the data analytics generated by the Data Analytics Platform may be made available to project participants in near-real time. The Data Analytics Platform may be built and configured to interoperate with and pull data from the blockchain through methods familiar to and appreciated by those of ordinary skill in the art.

The Data Analytics Platform may interoperate and interface with the Web Based Application in order to display and allow project participants to view and manipulate the data. (Example embodiments of how data from the Data Analytics Platform may be displayed through the Web Based Application are depicted at 230 in FIGS. 3, 4, and 6-9.) The Data Analytics Platform may be configured to interoperate and interface with the Web Based Application through methods familiar to and appreciated by those of ordinary skill in the art.

Report Generation Tool

The Data Analytics Platform may further integrate and interoperate with a Report Generation Tool that can be used to generate certain reports documenting the results of the data analysis. These reports may be generated through a Report Generation Tool, may be accessed through the Web Based Application, and may be stored and transferred among project participants through the blockchain. Certain documentation not generated by the Report Generation Tool—such as contracts, field reports, and other documentation relevant to a project—may also be stored and transferred on the blockchain and accessed through the Web Based Application in the same manner. (Example embodiments of the Report Generation Tool are depicted at 240 in FIGS. 1 and 13.) Example embodiments of how reports generated from the Report Generation Tool may be displayed in the Web Based Application are depicted at 250 in FIGS. 3-9.) The Report Generation Tool may generate certain reports, and these reports and other documentation may be stored and transferred on the blockchain and accessed through the Web Based Application, through methods familiar to and appreciated by those of ordinary skill in the art.

The invention claimed is:

1. A computer-implemented method for administration and governance of fiat and cryptocurrency funds in a distributed computer system, the method comprising:
   at an electronic device with one or more processors and memory:
      accessing a list of a plurality of participants, wherein each of the participants is associated with a respective cryptocurrency wallet accessible through a respective interface portal;
      minting crypto-currency earmarked to fiat funds deposited by a participant to an escrow account of a trustee bank, wherein each unique unit of the minted cryptocurrency is earmarked to a specific portion of the fiat funds in the escrow account;
      transferring the minted crypto-currency from a cryptocurrency wallet of the participant to one or more cryptocurrency wallets of one or more other participants designated by the participant depositing the fiat funds;
      monitoring transactions of the minted crypto-currency amongst the list of participants;
      maintaining a blockchain ledger of the transactions of minted crypto-currency;
      approving fiat fund conversion requests from the plurality of participants to redeem units of the crypto-currency for units of the fiat funds in the escrow account based on the maintained blockchain ledger; and
      redeeming the units of the crypto-currency, wherein each unique unit of the redeemed crypto-currency is redeemed for a corresponding portion of the fiat funds from which that unique unit of the crypto-currency was minted and to which that unique unit of the crypto-currency was earmarked.

2. The method of claim 1, wherein monitoring the transactions comprises:
   receiving a request from a participant to transfer cryptocurrency via the participant's interface portal.

3. The method of claim 1, wherein the participant depositing the fiat funds is a first participant, and wherein approving the fiat fund conversion requests comprises:
   receiving a fiat fund conversion request from a second participant of the participants to redeem the units of the crypto-currency for the units of the fiat funds via an interface portal of the second participant.

4. The method of claim 1, wherein minting the crypto-currency comprises:
   assigning each unit of the minted cryptocurrency with unique identifier data that links the unique unit of cryptocurrency directly to a corresponding unit of the fiat funds held in the escrow account.

5. The method of claim 1, further comprising:
   applying rules that govern which other participants a participant is permitted to conduct transactions with.

6. The method of claim 1, wherein minting the cryptocurrency comprises:
   receiving a message from a blockchain node of the trustee bank indicating that the fiat funds were deposited to the escrow account;
   minting the cryptocurrency in response to the message being verified by a plurality of blockchain nodes in the distributed computer system; and
   depositing the minted cryptocurrency to the cryptocurrency wallet of the participant.

7. The method of claim 4, comprising:
   permitting, via an interface portal of the participant, the participant to access data regarding transactions of the minted cryptocurrency earmarked to the fiat funds based on the unique identifier data.

8. The method of claim 1, wherein the participant depositing the fiat funds is a first participant, and wherein approving the fiat fund conversion requests comprises:
   in response to approving a fiat fund conversion request from a second participant to redeem the units of the crypto-currency for the units of the fiat funds:
      transferring the redeemed units of the crypto-currency from a cryptocurrency wallet of the second participant to a cryptocurrency wallet of the trustee bank; and
      releasing the units of the fiat funds from the escrow account associated with the first participant to the second participant.

9. The method of claim 8, wherein the redeemed units of the crypto-currency transferred to the cryptocurrency wallet of the trustee bank reside permanently in the cryptocurrency wallet of the trustee bank.

10. The method of claim 8, comprising:
    permitting the participant that deposited the units of the fiat funds corresponding to the redeemed units of the crypto-currency to access data regarding the fiat fund conversion request of the second participant.

11. An electronic device, comprising:
    one or more processors;
    memory; and
    one or more programs stored in memory, the one or more programs including instructions for:
       accessing a list of a plurality of participants, wherein each of the participants is associated with a respective cryptocurrency wallet accessible through a respective interface portal;
       minting crypto-currency earmarked to fiat funds deposited by a participant to an escrow account of a trustee bank, wherein each unique unit of the minted cryptocurrency is earmarked to a specific portion of the fiat funds in the escrow account;
       transferring the minted crypto-currency from a cryptocurrency wallet of the participant to one or more cryptocurrency wallets of one or more other participants designated by the participant depositing the fiat funds;
       monitoring transactions of the minted crypto-currency amongst the list of participants;
       maintaining a blockchain ledger of the transactions of minted crypto-currency;
       approving fiat fund conversion requests from the plurality of participants to redeem units of the crypto-currency for units of the fiat funds in the escrow account based on the maintained blockchain ledger; and redeeming the units of the crypto-currency, wherein each unique unit of the redeemed crypto-currency is redeemed for a corresponding portion of the fiat funds from which that unique unit of the crypto-currency was minted and to which that unique unit of the crypto-currency was earmarked.

12. The electronic device of claim 11, wherein to monitor the transactions, the one or more programs include instructions for:
receiving a request from a participant to transfer crypto-currency via the participant's interface portal.

13. The electronic device of claim 11, wherein the participant depositing the fiat funds is a first participant, and wherein to approve the fiat fund conversion requests, the one or more programs include instructions for:
receiving a fiat fund conversion request from a second participant of the participants to redeem the units of the crypto-currency for the units of the fiat funds via an interface portal of the second participant.

14. The electronic device of claim 11, wherein to mint the crypto-currency, the one or more programs include instructions for:
assigning each unit of the minted cryptocurrency with unique identifier data that links the unique unit of cryptocurrency directly to a corresponding unit of the fiat funds held in the escrow account.

15. The electronic device of claim 11, wherein the one or more programs further include instructions for:
applying rules that govern which other participants a participant is permitted to conduct transactions with.

16. The electronic device of claim 11, wherein to mint the cryptocurrency, the one or more programs include instructions for:
receiving a message from a blockchain node of the trustee bank indicating that the fiat funds were deposited to the escrow account;
minting the cryptocurrency in response to the message being verified by a plurality of blockchain nodes in the distributed computer system; and
depositing the minted cryptocurrency to the cryptocurrency wallet of the participant.

17. The electronic device of claim 14, the one or more programs include instructions for:
permitting, via an interface portal of the participant, the participant to access data regarding transactions of the minted cryptocurrency earmarked to the fiat funds based on the unique identifier data.

18. The electronic device of claim 11, wherein the participant depositing the fiat funds is a first participant, and wherein to approve the fiat fund conversion requests, the one or more programs include instructions for:
in response to approving a fiat fund conversion request from a second participant to redeem the units of the crypto-currency for the units of the fiat funds:
transferring the redeemed units of the crypto-currency from a cryptocurrency wallet of the second participant to a cryptocurrency wallet of the trustee bank; and
releasing the units of the fiat funds from the escrow account associated with the first participant to the second participant.

19. A non-transitory computer-readable storage medium comprising one or more programs for execution by one or more processors of a first electronic device, the one or more programs including instructions which, when executed by the one or more processors, cause the first electronic device to:
access a list of a plurality of participants, wherein each of the participants is associated with a respective crypto-currency wallet accessible through a respective interface portal;
mint crypto-currency earmarked to fiat funds deposited by a participant to an escrow account of a trustee bank, wherein each unique unit of the minted crypto-currency is earmarked to a specific portion of the fiat funds in the escrow account;
transfer the minted crypto-currency from a cryptocurrency wallet of the participant to one or more crypto-currency wallets of one or more other participants designated by the participant depositing the fiat funds;
monitor transactions of the minted crypto-currency amongst the list of participants;
maintain a blockchain ledger of the transactions of minted crypto-currency;
approve fiat fund conversion requests from the plurality of participants to redeem units of the crypto-currency for units of the fiat funds in the escrow account based on the maintained blockchain ledger; and
redeem the units of the crypto-currency, wherein each unique unit of the redeemed crypto-currency is redeemed for a corresponding portion of the fiat funds from which that unique unit of the crypto-currency was minted and to which that unique unit of the crypto-currency was earmarked.

20. The non-transitory computer-readable storage medium of claim 19, wherein to monitor the transactions, the first electronic device is caused to:
receive a request from a participant to transfer crypto-currency via the participant's interface portal.

21. The non-transitory computer-readable storage medium of claim 19, wherein the participant depositing the fiat funds is a first participant, and wherein to approve the fiat fund conversion requests, the first electronic device is caused to:
receive a fiat fund conversion request from a second participant of the participants to redeem the units of the crypto-currency for the units of the fiat funds via an interface portal of the second participant.

22. The non-transitory computer-readable storage medium of claim 19, wherein to mint the crypto-currency, the first electronic device is caused to:
assign each unit of the minted cryptocurrency with unique identifier data that links the unique unit of cryptocurrency directly to a corresponding unit of the fiat funds held in the escrow account.

23. The non-transitory computer-readable storage medium of claim 19, wherein the first electronic device is caused to:
apply rules that govern which other participants a participant is permitted to conduct transactions with.

24. The non-transitory computer-readable storage medium of claim 19, wherein to mint, the first electronic device is caused to:
receive a message from a blockchain node of the trustee bank indicating that the fiat funds were deposited to the escrow account;
mint the cryptocurrency in response to the message being verified by a plurality of blockchain nodes in the distributed computer system; and
deposit the minted cryptocurrency to the cryptocurrency wallet of the participant.

25. The non-transitory computer-readable storage medium of claim 22, wherein the first electronic device is caused to:

permit, via an interface portal of the participant, the participant to access data regarding transactions of the minted cryptocurrency earmarked to the fiat funds based on the unique identifier data.

26. The non-transitory computer-readable storage medium of claim 19, wherein the participant depositing the fiat funds is a first participant, and wherein to approve the fiat fund conversion requests, the first electronic device is caused to:

in response to approving a fiat fund conversion request from a second participant to redeem the units of the crypto-currency for the units of the fiat funds:
transfer the redeemed units of the crypto-currency from a cryptocurrency wallet of the second participant to a cryptocurrency wallet of the trustee bank; and
release the units of the fiat funds from the escrow account associated with the first participant to the second participant.

\* \* \* \* \*